United States Patent
Chen et al.

(10) Patent No.: US 10,936,047 B2
(45) Date of Patent: Mar. 2, 2021

(54) POWER STATE MANAGEMENT

(71) Applicant: INTEL CORPORATION, Santa Clara, CA (US)

(72) Inventors: Yu Chen, Shanghai (CN); Jianghong Du, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 106 days.

(21) Appl. No.: 16/462,606

(22) PCT Filed: Dec. 20, 2016

(86) PCT No.: PCT/CN2016/111024
§ 371 (c)(1),
(2) Date: May 21, 2019

(87) PCT Pub. No.: WO2018/112738
PCT Pub. Date: Jun. 28, 2018

(65) Prior Publication Data
US 2019/0278361 A1    Sep. 12, 2019

(51) Int. Cl.
*G06F 1/3287* (2019.01)
*G06F 1/28* (2006.01)
*G06F 1/3206* (2019.01)

(52) U.S. Cl.
CPC .............. *G06F 1/3287* (2013.01); *G06F 1/28* (2013.01); *G06F 1/3206* (2013.01)

(58) Field of Classification Search
CPC ......... G06F 1/28; G06F 1/3206; G06F 1/3287
See application file for complete search history.

(56) References Cited

U.S. PATENT DOCUMENTS 7,412,609 B2 * 8/2008 Oshins ............... G06F 9/4411
                                                  713/300
8,813,073 B2 * 8/2014 Kwon ................. G06F 9/5088
                                                  718/1
(Continued)

FOREIGN PATENT DOCUMENTS

CN    101040241 A    9/2007
CN    101419485 A    4/2009
(Continued)

OTHER PUBLICATIONS

International Searching Authority, "Written Opinion," dated Sep. 26, 2017 in connection with International Patent Application No. PCT/CN2016/111024, 4 pages.
(Continued)

*Primary Examiner* — Vincent H Tran
(74) *Attorney, Agent, or Firm* — Hanley, Flight and Zimmerman, LLC

(57) ABSTRACT

In one example, a system for managing power states can include a processor to detect a power state transition operation and detect historical callback information for each of a plurality of drivers of the system. The processor can also sort the plurality of drivers into a plurality of driver groups based on the historical callback information and execute the power state transition operation by transmitting a plurality of power state instructions for each driver to a plurality of processors based on the plurality of driver groups.

21 Claims, 4 Drawing Sheets

(56) References Cited

U.S. PATENT DOCUMENTS

| | | | |
|---|---|---|---|
| 8,930,633 B2* | 1/2015 | Amit | G06F 3/0659 |
| | | | 711/140 |
| 2004/0123172 A1* | 6/2004 | Sheller | G06F 1/3203 |
| | | | 713/323 |
| 2006/0053311 A1 | 3/2006 | Chary | |
| 2007/0220490 A1* | 9/2007 | Kobayashi | G06F 9/485 |
| | | | 717/124 |
| 2009/0204837 A1 | 8/2009 | Udaykumar et al. | |
| 2012/0166844 A1* | 6/2012 | Morgan | G06F 1/3246 |
| | | | 713/323 |

FOREIGN PATENT DOCUMENTS

| | | |
|---|---|---|
| CN | 101827088 A | 9/2010 |
| CN | 102238236 A | 11/2011 |

OTHER PUBLICATIONS

International Search Report for Related PCT Application PCT/CN2016/111024 with a completion date of Sep. 1, 2017 dated Sep. 26, 2017, 2 pages.

* cited by examiner

POWER STATE MANAGEMENT

CROSS REFERENCE TO RELATED APPLICATIONS

Pursuant to 35 U.S.C. § 371, this application is the United States National Stage Application of International Patent Application No. PCT/CN2016/111024, filed on Dec. 20, 2016, the contents of which are incorporated by reference as if set forth in their entirety herein.

TECHNICAL FIELD

This disclosure relates generally to managing power states and specifically, but not exclusively, to reducing a time to change power states of a computing device.

BACKGROUND

Computing devices are incorporating an increasing number of peripheral devices and corresponding drivers that enable the computing devices to communicate with the peripheral devices. Computing devices also support any number of different power states that reduce power consumption of the computing devices. In some examples, computing devices initiate calls to the drivers of the peripheral devices in order to place the computing devices in a reduced power consumption state such as a sleep state, among others.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
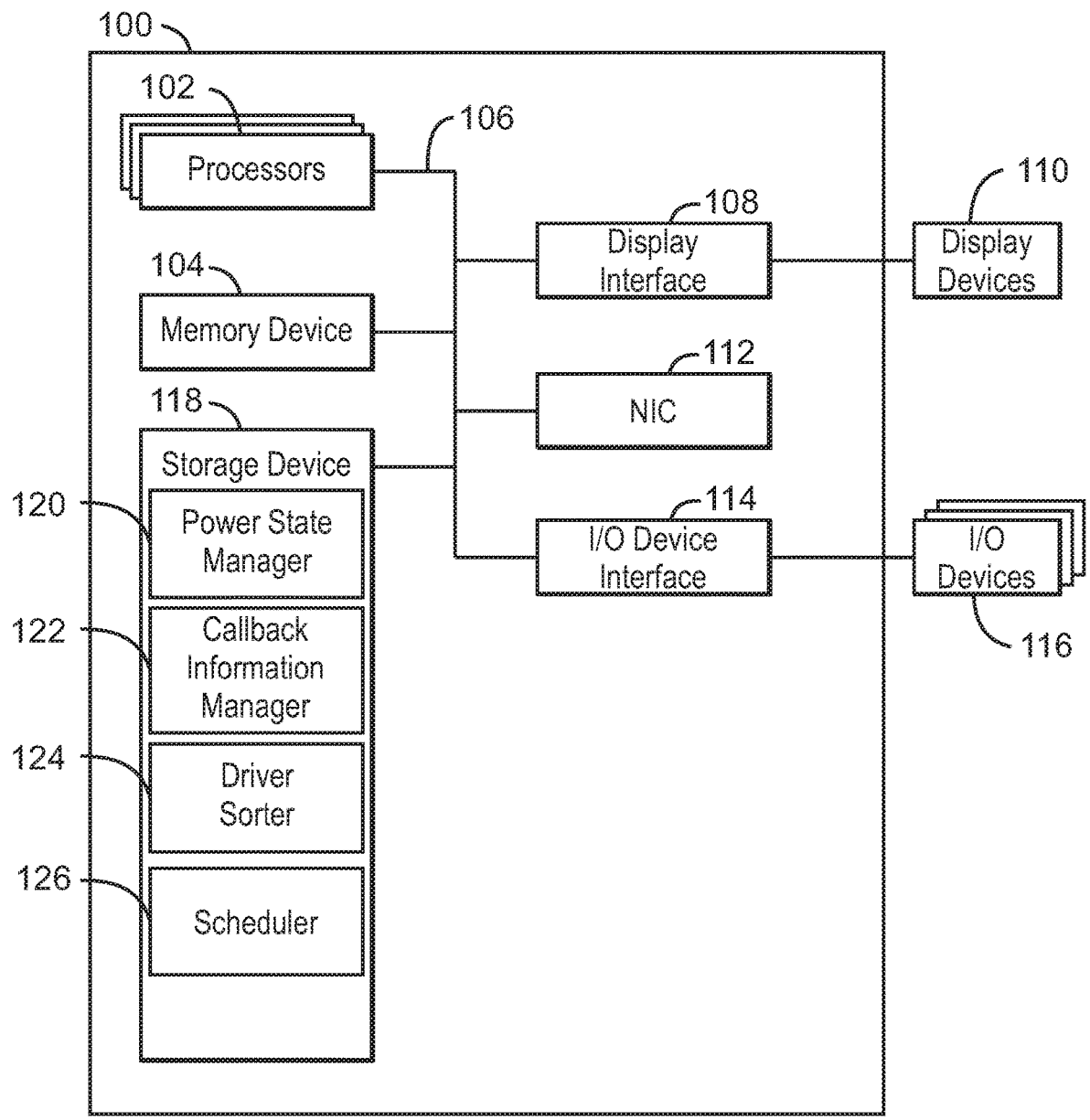
FIG. 1 illustrates a block diagram of a computing device that can manage power states.

As discussed above, computing devices can support any suitable number of different power states. For example, computing devices can support various system wide power states such as a working power state, a standby power state, a sleep power state, and a hibernate power state, among others. In some examples, the computing devices indicate a transition between power states to each driver in the computing devices. For example, an operating system of a computing device can transmit an indicator to each driver of a computing device, wherein the indicator provides information about the power state transition. A driver, as referred to herein, can include any suitable device driver that operates or controls a type of device electrically coupled to a computing device. For example, a driver can control operation of a keyboard, mouse, camera, sensor, or any other suitable device or component. In some examples, the drivers execute a callback function, which indicates if a driver has implemented the power state transition of a particular device.

The techniques described herein include a system that can detect a power state transition operation. A power state transition operation, as referred to herein, can include any operation that changes a system state of a device to reduce or increase the power consumption of the device. For example, a power state transition operation can include a resume operation, a suspend operation, a hibernation operation, a standby operation, a working or full power operation, and a sleep operation, among other system state operations. In some embodiments, the system can also detect historical callback information for each of a plurality of drivers of the system. In some examples, the historical callback information indicates a time period corresponding to a driver executing the power state transition operation on a particular device.

Additionally, in some embodiments, the system can sort the plurality of drivers into a plurality of driver groups based on the historical callback information. Furthermore, the system can execute the power state transition operation by transmitting a plurality of power state instructions for each driver to a plurality of processors based on the plurality of driver groups. For example, the system can include any number of processors or processing cores that can initiate the power state transition operation. In some embodiments, the processors or processing cores can process the power state transition operation for any number of drivers using any suitable sequential or parallel technique. Accordingly, the system described herein can transmit sorted groups of drivers to the processors or processing cores of the system to minimize latency associated with transitioning between power states.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a computing device that can manage power states. The computing device 100 may be, for example, a mobile phone, laptop computer, desktop computer, or tablet computer, among others. The computing device 100 may include processors 102 that are adapted to execute stored instructions, as well as a memory device 104 that stores instructions that are executable by the processors 102. The processors 102 can be single core processors, multi-core processors, a computing cluster, or any number of other configurations. In some embodiments, the processors 102 referred to herein can be processing cores residing in a single multi-core processor. A processing core, as referred to herein, can include any suitable processing unit that can read and execute computer-executable instructions. A single multi-core processor can include multiple processing cores on a single integrated circuit die or multiple processing cores on multiple integrated circuit dies in a single chip carrier or chip package. In some examples, the processing cores can execute instructions in parallel. In some embodiments, the processing cores may or may not share cache memory. In some examples, the processing cores can implement message passing or any suitable shared memory inter-core communication technique. The memory device 104 can include random access memory, read only memory, flash memory, or any other suitable memory systems. The instructions that are executed by the processors 102 may be used to implement a method that can manage power states.

The processors 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

In addition, a network interface controller (also referred to herein as a NIC) 112 may be adapted to connect the computing device 100 through the system interconnect 106 to a network (not depicted). The network (not depicted) may be a cellular network, a radio network, a wide area network (WAN), a local area network (LAN), or the Internet, among others.

The processors 102 may be connected through a system interconnect 106 to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

In some embodiments, the processors 102 may also be linked through the system interconnect 106 to any storage device 118 that can include a hard drive, an optical drive, a USB flash drive, an array of drives, a network storage device, or any combinations thereof. In some embodiments, the storage device 118 can include any suitable applications. In some embodiments, the storage device 118 can include a power state manager 120, a callback information manager 122, a driver sorter 124, and a scheduler 126. In some embodiments, the power state manager 120 can detect a power state transition operation that changes the power consumption of the computing device 100. In some embodiments, the callback information manager 122 can detect historical callback information for each of a plurality of drivers of the system. The historical callback information can indicate an execution time for each driver to transition between power states specified by the power state transition operation. In some embodiments, a driver sorter 124 can sort the plurality of drivers into a plurality of driver groups based on the historical callback information. In some embodiments, the scheduler 126 can execute the power state transition operation by transmitting a plurality of power state instructions for each driver to a plurality of processors based on the plurality of driver groups. The power state instructions can include functions performed by each driver when transitioning a device from a first power state to a second power state. In some examples, the scheduler 126 can be included as part of an operating system. The scheduler 126 can also be included as part of power management logic.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the power state manager 120, the callback information manager 122, the driver sorter 124, and the scheduler 126 may be partially, or entirely, implemented in hardware and/or in the processor 102. For example, the functionality may be implemented with an application specific integrated circuit, logic implemented in an embedded controller, a field-programmable gate array, or in logic implemented in the processors 102, among others. In some embodiments, the functionalities of the power state manager 120, the callback information manager 122, the driver sorter 124, and the scheduler 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
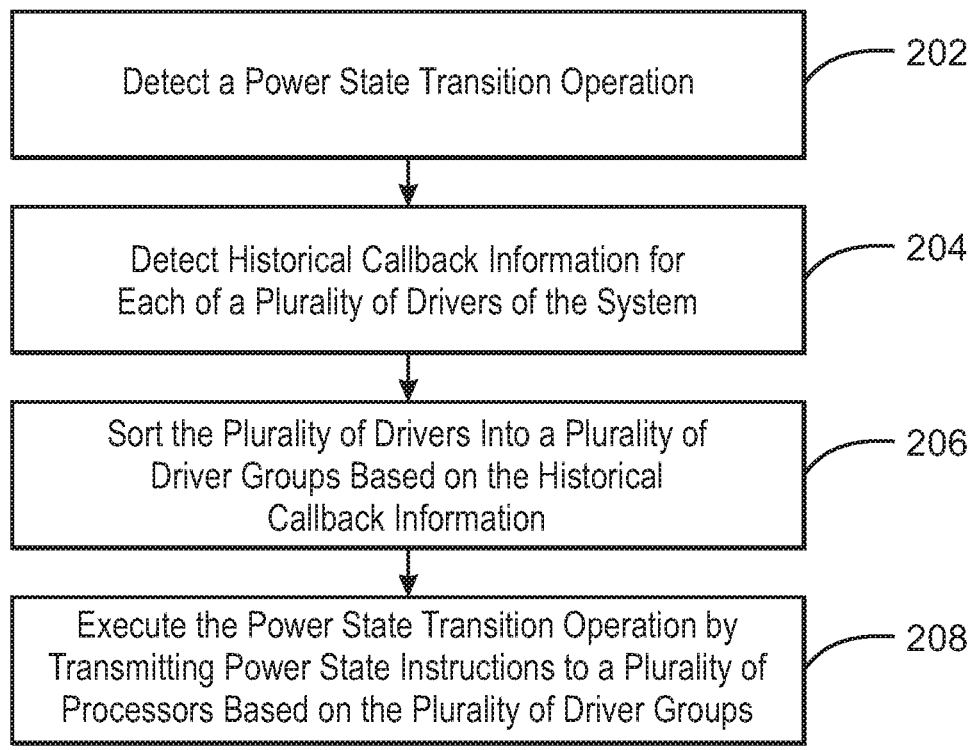
FIG. 2 illustrates a process flow diagram for managing power states of a computing device.

FIG. 2 illustrates a process flow diagram for managing power states. The method 200 illustrated in FIG. 2 can be implemented with any suitable computing component or device, such as the computing device 100 of FIG. 1.

At block 202, a power state manager 120 can detect a power state transition operation. A power state transition operation, as discussed above, can indicate that a system is to reduce power consumption or increase power consumption. For example, the power state transition operation can indicate that a system is to transition from a wake state to any number of sleep states, or from a sleep state to a wake state. In some embodiments, the power state transition operation can change the power consumption of a system, which can include a processor and any number of peripheral components. In some examples, the power state transition operation can change a power state of a system, wherein the power states include a wake state, suspend state, sleep state, hibernate state, and the like. In some embodiments, a wake state or wake event can include any event that asserts a power status change interrupt such as a card insertion, a battery state change, and the like. In some examples, each power state can have a different amount of latency. For example, a system may support five different sleeping states associated with different latencies and memory management techniques.

A first sleeping state (also referred to herein as S1), can be a low wake latency sleeping state. In this state, no system context may be lost (processor or chip set) and hardware can maintain system context. A second sleeping state (also referred to herein as S2) can be a separate low wake latency sleeping state. The second sleeping state can be similar to the S1 sleeping state except that the processor and system cache context may be deleted or lost. In some examples, an operating system or scheduler 126 can be responsible for maintaining the caches and processor context. In response to a resume state transition, control can start from a processor's reset vector after the wake event. In some embodiments, a third sleeping state (also referred to herein as S3) can be an additional low wake latency sleeping state, wherein all system contexts can be lost except system memory. In some examples, processor, cache, and chip set context are lost or deleted in the third sleeping state. In some embodiments, hardware can maintain memory context and restore some processor and cache configuration context. In response to a resume state transition, control can start from a processor's reset vector after the wake event.

In some embodiments, a fourth sleeping state (also referred to herein as S4) can be the lowest power, longest wake latency sleeping state supported. In order to reduce power to a minimum, the hardware platform can power off all devices while maintaining the platform context. In some embodiments, a fifth sleep state (also referred to herein as S5) can be similar to the S4 sleep state except that the operating system may not save any context. The S5 sleep state can place a system in a "soft" off state and require a complete boot when the system transitions to a wake state. In some examples, the first sleeping state can be referred to as a standby state, the second sleep state can be referred to as a sleep state, the third sleep state can be referred to as a suspend state, the fourth sleep state can be referred to as a hibernate state, and the fifth sleep state can be referred to as a soft-off state.

At block 204, a callback information manager 122 can detect historical callback information for each of a plurality of drivers of the system. For example, a power state transition operation can include a set of instructions that are to be executed by each driver stored in a computing device. In some embodiments, the historical callback information can indicate an execution time for a driver to execute a set of instructions for transitioning between power states. For example, the callback information can correspond to an amount of time a processor uses to execute the power state transition operation and return a result. In some examples, the callback information can indicate an amount of time for a processor to provide a result from blocking or synchronous callback code, which can be executed prior to a function corresponding to the power state transition operation returns. In some embodiments, the callback information manager 122 can collect the historical callback information for each driver from a previously executed power state transition operation. In some examples, the historical callback information for each driver comprises a suspend value and a resume value. A suspend value, as referred to herein, indicates an execution time for a processor to execute a driver corresponding to transitioning a device from a wake state to any suitable sleep state. A resume value, as referred to herein, indicates an execution time for a processor to execute a driver corresponding to transitioning a device from a sleep state to a wake state. In some embodiments, a suspend value and a resume value for a driver can be different, which indicates that a driver has a different execution time when transitioning from a wake state to a sleep state than a sleep state to a wake state.

In some embodiments, the callback information manager 122 can update the suspend value or the resume value for at least one of the plurality of drivers in response to detecting a change to the at least one driver. For example, an update to a driver can result in the callback information manager 122 determining if the driver has a different execution time when executing a power state transition operation.

In some examples, callback information can be stored for a transition between any number of power states. For example, a first sleep state or S1 sleep state may include preserving a video controller context and video memory contents. In some embodiments, a second sleep state or S2 sleep state may not include preserving the video controller context or the video memory contents. Similarly, an audio device driver may generate a pause command and store audio context information that can be resumed after a device transitions to a lower power state such as any suitable sleep state. In some embodiments, a transition to a sleep state can result in the audio device driver closing any audio connections. Accordingly, the resume value or suspend value corresponding to a first sleep state or a second sleep state may be different. In some embodiments, the callback information manager 122 may store the callback information for a driver for a single execution of a power state transition operation and use the callback information for any subsequent power state transition operation. For example, the callback information manager 122 can detect a suspend value for a transition from a wake state to a first sleep state and use the suspend value for any subsequent power transitions from a wake state to a first sleep state. Similarly, the callback information manager 122 can store suspend and resume values for a transition between a wake state and a first power state, a wake state and a second power state, a wake state and a third power state, a wake state and a fourth power state, and a wake state and a fifth power state.

At block 206, a driver sorter 124 can sort the plurality of drivers into a plurality of driver groups based on the historical callback information. For example, a driver sorter 124 may determine a number of processors in a system that can execute the power state transition operation for different drivers. In some embodiments, the processors can execute the power state transition operation for multiple drivers in parallel. For example, a first processor can execute an audio driver to transition a power state of an audio device to a sleep state from a wake state or from a sleep state to a wake state. A second processor can simultaneously execute a graphics driver to transition the power state of the graphics device to a sleep state from a wake state or from a sleep state to a wake state. Thus, multiple processors can simultaneously execute the power state transition operation for any number of drivers based on the driver groups, which can reduce the latency for placing a device in a different power state. In some embodiments, the driver sorter 124 sorts drivers that are being executed by a computing device and does not sort drivers that are not in current use.

In some examples, the driver sorter 124 can sort a plurality of drivers into groups using any suitable technique such as a greedy technique, a brute force technique, a neural network technique, and the like. For example, the driver sorter 124 can use any suitable algorithm or technique to determine a group of drivers to execute with each processor in order to reduce latency during the power state transition operation. In some embodiments, the driver sorter 124 can sort the plurality of drivers based on the historical callback time of each driver, a number of processors of the system, and a number of drivers involved with the power state transition operation. In some embodiments, the driver sorter 124 sorts drivers and sends the drivers to different processors for each transition between power states. An example of grouping drivers is described in greater detail below in relation to FIG. 3.

At block 208, a scheduler 126 can execute the power state transition operation by transmitting power state instructions for each driver to a plurality of processors based on the plurality of driver groups. As discussed above, the plurality of processors can include single core processors, multi-core processors, or a single multi-core processor, among others. In some examples, the plurality of processors that execute the power state instructions are a plurality of processing cores residing on a single multi-core processor. The power state instructions, as referred to herein, can include the instructions executed by each driver to transition a device from a first power state to a second power state. For example, the power state instructions can transition an audio device between power states, a graphics card between power states, and the like. In some embodiments, the processors execute the power state transition operation for each driver before a power to sleep routine is executed. For example, the power state transition operation for each driver can be executed prior to the scheduler 126 writing a sleep vector of cached data to persistent or non-volatile memory. In some embodiments, the scheduler 126 indicates a wake up routine that retrieves cached data from persistent or non-volatile memory before transmitting the power state transition operation to any number of drivers for devices. The scheduler 126 can transition the system to the requested power state in response to drivers for any number of devices executing the power state transition operation. As discussed above, the scheduler 126 can transmit the groups of drivers to any number of processors, wherein the groups are selected based on drivers that can be executed simultaneously by different processors to reduce the latency caused by transitioning from a first power state to a second power state.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the scheduler 126 can indicate to the processors that the processor state is to be transitioned to a different power state once the device drivers have executed the power state transition operation. The different processor power states can include modifying cache coherency, flushing a cache, or throttling execution of instructions.

Figure 3:
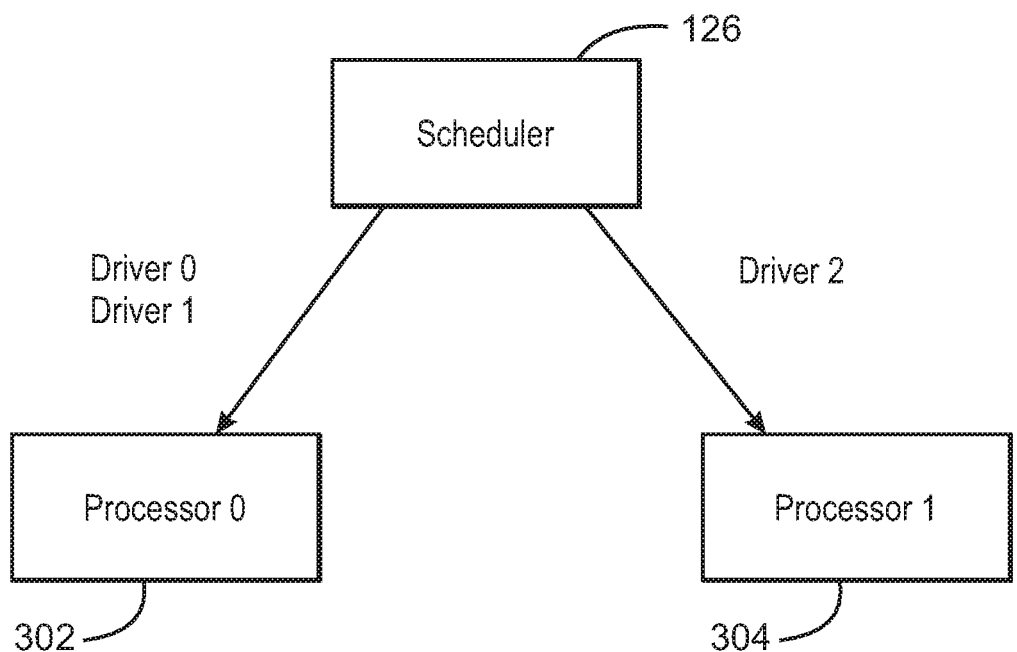
FIG. 3 is a block diagram of a scheduler and processors that can manage power states.

FIG. 3 is a block diagram of processors executing a power state transition operation. The scheduler 126 can transmit power state transition operations for drivers to any number of processors such as processor 0 302 and processor 1 304. In some embodiments processor 0 302 and processor 1 304 can be single core processors or processing cores residing in a single multi-core processor. For example, processor 0 302 and processor 1 304 can be independent processing units manufactured on a single integrated circuit die. In some examples, processor 0 302 and processor 1 304 can be independent processing units manufactured on multiple integrated circuit dies in a single chip carrier or chip package. In some embodiments, the scheduler 126 transmits the power state transition operation based on a callback time of each driver. For example, driver 0 may have a callback time of 20 milliseconds, driver 1 may have a callback time of 30 milliseconds, and driver 2 may have a callback time of 50 milliseconds. The scheduler 126 can transmit instructions for the power state transition operation for driver 0 and driver 1 to processor 0 302 and transmit instructions for the power state transition operation for driver 2 to processor 1 304. The scheduler 126 can thus ensure that the power state transition operation is executed by driver 0, driver 1, and driver 2 within 50 milliseconds. If the scheduler 126 did not sort driver 0, driver 1, and driver 2 to minimize latency, the execution time of the power state transition operations for the drivers could be longer. For example, if the scheduler 126 transmitted the instructions for the power state transition operation for driver 2 and driver 0 to either processor 0 302 or processor 1 304, the execution time would be greater than 50 milliseconds. Thus, the techniques described herein can minimize the execution time of the power state transition operation using any number of processors or processing cores.

In some embodiments, the driver sorter 124 can determine dependencies between drivers. For example, a first driver may depend from a second driver. The driver sorter 124 may allocate the first driver and the second driver to a single processor to enable sequential execution of the first driver and the second driver. Accordingly, the callback information for the first driver and the second driver may be aggregated to indicate that the first driver and the second driver cannot be executed in parallel on multiple processors.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional processors, drivers, etc.).

Figure 4:
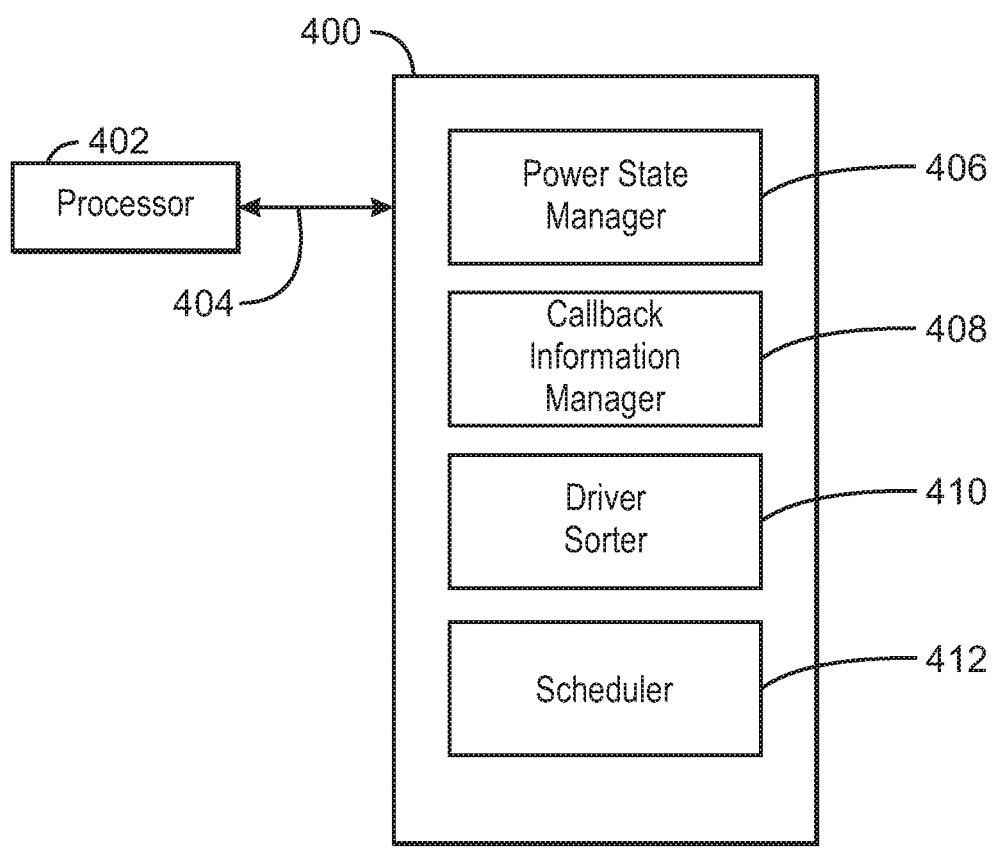
FIG. 4 is an example of a tangible, non-transitory computer-readable medium for managing power states.

FIG. 4 is an example block diagram of a non-transitory computer readable media for managing power states. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a power state manager 406 can detect a power state transition operation. In some embodiments, a callback information manager 408 can detect historical callback information for each of a plurality of drivers of the system. In some embodiments, a driver sorter 410 can sort the plurality of drivers into a plurality of driver groups based on the historical callback information. In some embodiments, a scheduler 410 can execute the power state transition operation by transmitting a plurality of power state instructions for each driver to a plurality of processors based on the plurality of driver groups.

It is to be understood that any suitable number of the software components shown in FIG. 4 may be included within the tangible, non-transitory computer-readable medium 400. Furthermore, any number of additional software components not shown in FIG. 4 may be included within the tangible, non-transitory, computer-readable medium 400, depending on the specific application.

Example 1

In some examples, a system for managing power states can include a plurality of processors and a storage device to store computer executable instructions, wherein the computer executable instructions can detect a power state transition operation and detect historical callback information for each of a plurality of drivers of the system. In some embodiments, the processor can also sort the plurality of drivers into a plurality of driver groups based on the historical callback information and execute the power state transition operation by transmitting a plurality of power state instructions for each driver to the plurality of processors based on the plurality of driver groups.

Alternatively, or in addition, the computer executable instructions can collect the historical callback information for each driver from a previously executed power state transition operation. Alternatively, or in addition, the historical callback information for each driver can include a suspend value and a resume value. Alternatively, or in addition, the computer executable instructions can update the suspend value or the resume value for at least one of the plurality of drivers in response to detecting a change to the at least one driver. Alternatively, or in addition, the computer executable instructions can sort the plurality of drivers based on a greedy technique, a brute force technique, or a neural network technique. Alternatively, or in addition, a number of the driver groups can correspond to a number of processors of the system. Alternatively, or in addition, the computer executable instructions can sort the plurality of drivers based on the historical callback time of each driver, a number of processors in the system, and a number of drivers corresponding to the power state transition operation. Alternatively, or in addition, the power state transition operation can include a transition between a wake state and a first sleeping state, the wake state and a second sleeping state, the wake state and a third sleeping state, the wake state and a fourth sleeping state, or the wake state and a fifth sleeping state.

Example 2

In some embodiments, a method for managing power states can include detecting a power state transition operation and detecting historical callback information for each of a plurality of drivers of the system. The method can also include sorting the plurality of drivers into a plurality of driver groups based on the historical callback information and executing the power state transition operation by transmitting a plurality of power state instructions for each driver to a plurality of processors based on the plurality of driver groups.

Alternatively, or in addition, the method can include collecting the historical callback information for each driver from a previously executed power state transition operation. Alternatively, or in addition, the historical callback information for each driver can include a suspend value and a resume value. Alternatively, or in addition, the method can include updating the suspend value or the resume value for at least one of the plurality of drivers in response to detecting a change to the at least one driver. Alternatively, or in addition, the method can include sorting the plurality of drivers based on a greedy technique, a brute force technique, or a neural network technique. Alternatively, or in addition, a number of the driver groups can correspond to a number of processors of the system. Alternatively, or in addition, the method can include sorting the plurality of drivers based on the historical callback time of each driver, a number of processors in the system, and a number of drivers corresponding to the power state transition operation. Alternatively, or in addition, the power state transition operation can include a transition between a wake state and a first sleeping state, the wake state and a second sleeping state, the wake state and a third sleeping state, the wake state and a fourth sleeping state, or the wake state and a fifth sleeping state Example 3

In some embodiments, a non-transitory computer-readable medium for managing power states can include a plurality of instructions that in response to being executed by a processor, cause the processor to detect a power state transition operation and detect historical callback information for each of a plurality of drivers of the system. The plurality of instructions can also cause the processor to sort the plurality of drivers into a plurality of driver groups based on the historical callback information and execute the power state transition operation by transmitting a plurality of power state instructions for each driver to a plurality of processors based on the plurality of driver groups.

Alternatively, or in addition, the plurality of instructions can also cause the processor to collect the historical callback information for each driver from a previously executed power state transition operation. Alternatively, or in addition, the historical callback information for each driver can include a suspend value and a resume value. Alternatively, or in addition, the plurality of instructions can also cause the processor to update the suspend value or the resume value for at least one of the plurality of drivers in response to detecting a change to the at least one driver. Alternatively, or in addition, the plurality of instructions can also cause the processor to sort the plurality of drivers based on a greedy technique, a brute force technique, or a neural network technique. Alternatively, or in addition, a number of the driver groups can correspond to a number of processors of the system. Alternatively, or in addition, the plurality of instructions can also cause the processor to sort the plurality of drivers based on the historical callback time of each driver, a number of processors in the system, and a number of drivers corresponding to the power state transition operation. Alternatively, or in addition, the power state transition operation can include a transition between a wake state and a first sleeping state, the wake state and a second sleeping state, the wake state and a third sleeping state, the wake state and a fourth sleeping state, or the wake state and a fifth sleeping state.

Example 4

In some examples, a system for managing power states can include a plurality of processors and a storage device to store computer executable instructions, wherein the computer executable instructions comprise means for detecting a power state transition operation and means for detecting historical callback information for each of a plurality of drivers of the system. In some embodiments, the computer executable instructions can also comprise means for sorting the plurality of drivers into a plurality of driver groups based on the historical callback information and means for executing the power state transition operation by transmitting a plurality of power state instructions for each driver to the plurality of processors based on the plurality of driver groups.

Alternatively, or in addition, the computer executable instructions can include means for collecting the historical callback information for each driver from a previously executed power state transition operation. Alternatively, or in addition, the historical callback information for each driver can include a suspend value and a resume value. Alternatively, or in addition, the computer executable instructions can include means for updating the suspend value or the resume value for at least one of the plurality of drivers in response to detecting a change to the at least one driver. Alternatively, or in addition, the computer executable instructions can include means for sorting the plurality of drivers based on a greedy technique, a brute force technique, or a neural network technique. Alternatively, or in addition, a number of the driver groups can correspond to a number of processors of the system. Alternatively, or in addition, the computer executable instructions can include means for sorting the plurality of drivers based on the historical callback time of each driver, a number of processors in the system, and a number of drivers corresponding to the power state transition operation. Alternatively, or in addition, the power state transition operation can include a transition between a wake state and a first sleeping state, the wake state and a second sleeping state, the wake state and a third sleeping state, the wake state and a fourth sleeping state, or the wake state and a fifth sleeping state.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), a field-programmable gate array, etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for managing power states comprising:
   a plurality of processors; and
   a storage device to store computer executable instructions, wherein the computer executable instructions are to:
   detect a power state transition operation;
   detect historical callback information for each of a plurality of drivers of the system;
   sort the plurality of drivers into a plurality of driver groups based on the historical callback information; and
   execute the power state transition operation by transmitting a plurality of power state instructions for each driver to the plurality of processors based on the plurality of driver groups.

2. The system of claim 1, wherein the computer executable instructions are to collect the historical callback information for each driver from a previously executed power state transition operation.

3. The system of claim 1, wherein the historical callback information for each driver comprises a suspend value and a resume value.

4. The system of claim 3, wherein the computer executable instructions are to update the suspend value or the resume value for at least one of the plurality of drivers in response to detecting a change to the driver.

5. The system of claim 1, wherein the computer executable instructions are to sort the plurality of drivers based on a greedy technique, a brute force technique, or a neural network technique.

6. The system of claim 1, wherein a number of the driver groups corresponds to a number of processors of the system.

7. The system of claim 1, wherein the computer executable instructions are to sort the plurality of drivers based on the historical callback information for each driver, a number of processors in the system, and a number of drivers corresponding to the power state transition operation.

8. The system of claim 1, wherein the power state transition operation comprises a transition between a wake state and a first sleeping state, the wake state and a second sleeping state, the wake state and a third sleeping state, the wake state and a fourth sleeping state, or the wake state and a fifth sleeping state.

9. A method for managing power states comprising:
   detecting a power state transition operation;
   detecting historical callback information for each of a plurality of drivers of a system;

sorting the plurality of drivers into a plurality of driver groups based on the historical callback information; and executing the power state transition operation by transmitting a plurality of power state instructions for each driver to a plurality of processors based on the plurality of driver groups.

10. The method of claim 9, comprising collecting the historical callback information for each driver from a previously executed power state transition operation.

11. The method of claim 9, wherein the historical callback information for each driver comprises a suspend value and a resume value.

12. The method of claim 11, comprising updating the suspend value or the resume value for at least one of the plurality of drivers in response to detecting a change to the driver.

13. The method of claim 9 comprising sorting the plurality of drivers based on a greedy technique, a brute force technique, or a neural network technique.

14. The method of claim 9, wherein a number of the driver groups corresponds to a number of processors in the system.

15. The method of claim 9 comprising sorting the plurality of drivers based on the historical callback information for each driver, a number of processors in the system, and a number of drivers corresponding to the power state transition operation.

16. The method of claim 9, wherein the power state transition operation comprises a transition between a wake state and a first sleeping state, the wake state and a second sleeping state, the wake state and a third sleeping state, the wake state and a fourth sleeping state, or the wake state and a fifth sleeping state.

17. A non-transitory computer-readable medium for managing power states comprising instructions that in response to being executed by a processor, cause the processor to:
detect a power state transition operation;
detect historical callback information for each of a plurality of drivers of a system;
sort the plurality of drivers into a plurality of driver groups based on the historical callback information; and
execute the power state transition operation by transmitting a plurality of power state instructions for each driver to a plurality of processors based on the plurality of driver groups.

18. The non-transitory computer-readable medium of claim 17, wherein the instructions cause the processor to collect the historical callback information for each driver from a previously executed power state transition operation.

19. The non-transitory computer-readable medium of claim 17, wherein the instructions cause the processor to sort the plurality of drivers based on a greedy technique, a brute force technique, or a neural network technique.

20. The non-transitory computer-readable medium of claim 17, wherein the instructions cause the processor to sort the plurality of drivers based on the historical callback information for each driver, a number of processors in the system, and a number of drivers involved with the power state transition operation.

21. The non-transitory computer-readable medium of claim 17, wherein the power state transition operation comprises transition between a wake state and a first sleeping state, the wake state and a second sleeping state, the wake state and a third sleeping state, the wake state and a fourth sleeping state, or the wake state and a fifth sleeping state.

* * * * *